United States Patent [19]

Watson

[11] 4,054,533
[45] Oct. 18, 1977

[54] HEAT TRANSFER FLUIDS HAVING LOW FREEZE POINTS

[75] Inventor: William David Watson, Midland, Mich.

[73] Assignee: The Dow Chemical Company, Midland, Mich.

[21] Appl. No.: 699,545

[22] Filed: June 24, 1976

[51] Int. Cl.$^2$ ............................................. C09K 5/00
[52] U.S. Cl. ........................................................ 252/73
[58] Field of Search ................................. 252/73, 67

[56] References Cited

U.S. PATENT DOCUMENTS

| | | | |
|---|---|---|---|
| 3,888,777 | 6/1975 | Jackson et al. | 252/73 |
| 3,966,626 | 6/1976 | Jackson et al. | 252/73 |

Primary Examiner—Harris A. Pitlick
Attorney, Agent, or Firm—G. R. Plotecher

[57] ABSTRACT

Heat transfer fluids consisting essentially of about, by weight:

a. 20 to about 40 percent diphenyl ether;
b. 40 to about 60 percent of a 2-biphenylylphenyl ether (2-bippe) and 4-biphenylylphenyl ether (4-bippe) mixture at a 2-bippe:4-bippe weight ratio of at least about 2:1; and
c. 12 to about 25 percent of a polyphenylphenol mixture exhibit freeze points of −18° C or less. These heat transfer fluids have excellent fluidity over a broad temperature range and display unexpectedly good thermal stability.

5 Claims, No Drawings

HEAT TRANSFER FLUIDS HAVING LOW FREEZE POINTS

BACKGROUND OF THE INVENTION

1. Field of the Invention

This invention relates to heat transfer fluids. In one aspect, this invention relates to aryl ether heat transfer fluids. In another aspect, this invention relates to heat transfer fluids comprising aryl ethers and polyphenylphenols.

2. Description of the Prior Art

The components of the present invention are known. Jackson et al. teach in U.S. Pat. Nos. 3,888,777, 3,907,696 and 3,966,626, various heat transfer fluids comprising certain of the components used herein, particularly diphenyl ether, 2-biphenylylphenyl ether and 4-biphenylylphenyl ether. However, these heat transfer fluids also comprise such components as biphenyls and polyphenyl ethers which are not present in the instant invention. Moreover, these heat transfer fluids do not have the unusually good fluidity of the instant invention at low temperatures (0° C. and below).

Copending application by Watson et al., entitled "HEAT TRANSFER FLUIDS HAVING A LOW FREEZE POINT" and filed even date herewith, teaches a heat transfer fluid comprising diphenyl ether, 2-, 3- and 4-biphenylylphenyl ether, and polyphenylphenols in various proportions. The present invention differs from the Watson et al. invention by the relative amounts of polyphenylphenol and 3-biphenylylphenyl ether.

SUMMARY OF THE INVENTION

Heat transfer fluids having freeze points of about −18° C or less consist essentially of about, by weight:
a. 20 to about 40 percent diphenyl ether;
b. 40 to about 60 percent of a 2-biphenylylphenyl ether (2-bippe) and 4-biphenylylphenyl ether (4-bippe) mixture at a 2-bippe:4-bippe weight ratio of at least about 2:1; and
c. 12 to about 25 percent of a polyphenylphenol mixture.

This invention demonstrates remarkable fluidity at low temperatures while maintaining exceptional thermal stability. The latter is surprising since it is known that most phenolic materials decrease the thermal stability of a heat transfer fluid.

DETAILED DESCRIPTION OF THE INVENTION

All the components of this invention are commercially available and require little description. Diphenyl ether has the structural formula (I)

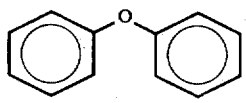

The biphenylylphenyl ethers here used have the structural formulae (II)

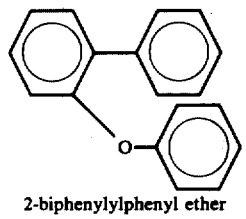

2-biphenylylphenyl ether (III)

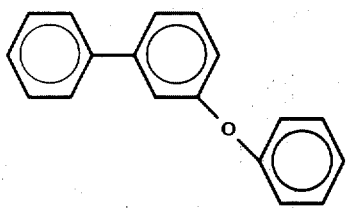

3-biphenylylphenyl ether (IV)

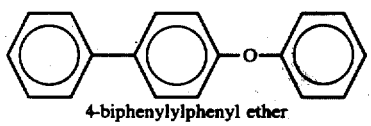

4-biphenylylphenyl ether

The preparation of biphenylylphenyl ether generally results in a mixture of the above isomers. The mixture typically contains about 2 percent by weight of the 3-isomer, the remainder being the 2- and 4-isomers in a ratio of about 2:1. This ether mixture is quite suitable for use in the instant invention without modification.

The polyphenylphenol mixture here used comprises both diphenylphenols of the formulae (V)

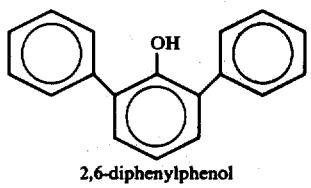

2,6-diphenylphenol (VI)

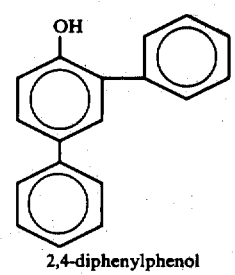

2,4-diphenylphenol and triphenylphenols of the possible formulae (VII)

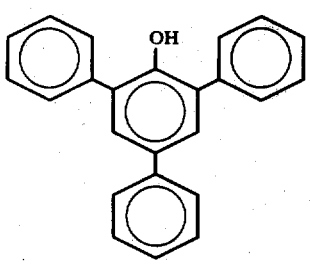

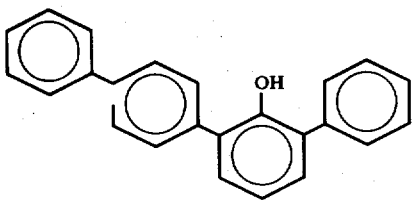

(VIII)

and various other isomers thereof. While the practice of this invention can include any suitable di- and triphenylphenol mixture, the polyphenylphenol mixture consisting primarily (about 80 weight percent) of 2,6- and 2,4-diphenylphenol with lesser amounts (about 20 weight percent) of various triphenylphenol and other diphenylphenol isomers is typically used.

Minor amounts, typically less than about 7 weight percent, of various impurities can be present in the instant invention without adversely affecting its properties (low freeze point and thermal stability). These impurities are usually a result of the manufacturing processes employed to prepare this invention's various components and include such compounds as o- and p-phenylphenol, o- and m-terphenyl, phenylnaphthalene, methylphenylnaphthalene and the like. Of course, it is preferred to keep these impurities at the lowest practical level.

The heat transfer fluids of the instant invention are, of course, mixtures of the above components. At a minimum, these mixtures consist essentially of about:
 a. 20 percent, and preferably about 25 percent, diphenyl ether;
 b. 40 percent, and preferably about 45 percent, of a 2-biphenylylphenyl ether (2-bippe) and 4-biphenylylphenyl ether (4-bippe) mixture at a 2-bippe:4-bippe weight ratio of at least about 2:1; and
 c. 12 percent, and preferably about 15 percent, of a polyphenylphenol mixture.

At a maximum, these mixtures consist essentially of about:
 a. 40 percent, and preferably about 35 percent, diphenyl ether;
 b. 60 percent, and preferably about 55 percent, of a 2-biphenylylphenyl ether (2-bippe) and 4-biphenylylphenyl ether (4-bippe) mixture at a 2-bippe:4-bippe weight ratio of at least about 2:1; and
 c. 25 percent, and preferably about 20 percent, of a polyphenylphenol mixture.

The heat transfer fluid consisting essentially of about:
 a. 30 percent diphenyl ether;
 b. 50 percent of a 2-biphenylylphenyl ether (2-bippe) and 4-biphenylylphenyl ether (4-bippe) mixture at a 2-bippe:4-bippe weight ratio of at least about 2:1; and
 c. 20 percent of a polyphenylphenol mixture
is especially preferred.

The heat transfer fluids of the present invention are used in the same manner as known fluids. However, because of their exceptional fluidity at low temperatures, they can be used under more adverse conditions than the known fluids without the need for special precautions. Illustratively, the present fluids can be employed in outside conduits year-round in the northern climes. Moreover, these fluids exhibit high boiling points and the characteristically lower vapor pressure of such fluids. Consequently, pressure in the heating units wherein these fluids are employed is reduced and accordingly, the work required for maintenance and leak prevention is reduced.

The following examples are illustrative of certain specific embodiments of this invention. However, these examples are for illustrative purposes only and should not be construed as limitations upon the invention. Unless otherwise indicated, all parts and percentages are by weight.

SPECIFIC EMBODIMENTS

Mixtures of diphenyl ether, 2- and 4-biphenylylphenyl ether and polyphenylphenols were prepared in the various proportions stated in Table I.

TABLE I

FREEZE POINT DATA FOR VARIOUS DIPHENYL ETHER, 2- AND 4-BIPHENYLYLPHENYL ETHER AND POLYPHENYLPHENOL MIXTURES

| Ex | DPE[1] (%) | 2-Bippe[2] (%) | 3-Bippe[3] (%) | 4-Bippe[4] (%) | PPP[5] (%) | Other[6] (%) | 2-/4- Bippe Ratio | Freeze Point Data 0° C | −18° C |
|---|---|---|---|---|---|---|---|---|---|
| 1 | 30.0 | 41.1 | 1.0 | 18.1 | 7.9 | 1.8 | 2.27 | 0.25S[7] | S[8] |
| 2 | 30.0 | 38.2 | 0.9 | 16.8 | 12.3 | 1.7 | 2.27 | trace[9] | S |
| 3 | 30.0 | 35.2 | 0.9 | 15.5 | 16.8 | 1.6 | 2.27 | L[10] | trace |
| 4 | 30.0 | 32.3 | 0.8 | 14.3 | 21.2 | 1.4 | 2.27 | L | trace |
| 5 | 30.0 | 29.3 | 0.7 | 13.0 | 25.6 | 1.3 | 2.27 | L | L |
| 6 | 30.0 | 26.4 | 0.6 | 11.7 | 30.1 | 1.2 | 2.27 | L | L |
| 7 | 29.9 | 44.7 | 1.9 | 19.2 | 1.6 | 2.6 | 2.33 | S | — |
| 8 | 30.0 | 38.5 | 1.4 | 18.8 | 5.7 | 5.7 | 2.05 | S | — |
| 9 | 30.0 | 39.2 | 1.7 | 16.8 | 9.3 | 3.0 | 2.33 | 0.25S | — |
| 10 | 30.1 | 34.5 | 1.4 | 14.7 | 12.5 | 6.7 | 2.36 | L | L |
| 11 | 29.8 | 35.6 | 1.9 | 14.9 | 14.6 | 3.2 | 2.38 | L | 0.25S |
| 12 | 30.2 | 31.9 | 1.3 | 14.1 | 16.4 | 6.2 | 2.27 | L | L |

[1]Diphenyl ether
[2]2-Biphenylylphenyl ether
[3]3-Biphenylylphenyl ether
[4]4-Biphenylylphenyl ether
[5]Polypenylphenol mixture comprising about 80 weight percent 2,6 and 2,4-diphenylphenols and the balance (about 20 weight percent) various triphenyphenol and other biphenylphenol isomers
[6]Various impurities, such as o- and P-phenylphenols, o- and m-terphenyls, phenylnaphthalene, methylphenylnaphthalene, etc.
[7]Solid fraction
[8]Solid
[9]Crystals present in minor amounts
[10]Liquid The Table I freeze points are surprising because the calculated freeze point of a 30 percent diphenyl ether, 35 percent 2-biphenylylphenyl ether, 15 percent 4-biphenylylphenyl ether and 20 percent polyphenylphenol mixture is 4.8° C (as calculated below).

FREEZE POINT CALCULATION[1] FOR 30% DIPHENYL ETHER,
35% 2-BIPPE, 15% 4-BIPPE AND 20% POLYPHENYLPHENOL MIXTURE

| Component | Moles | Mole Fraction | Temperature at which first crystals form | | |
|---|---|---|---|---|---|
| | | | 1/T | T° K | T° C |
| Diphenyl ether | 0.176 | 0.383 | 0.00390 | 256.4 | −16.8 |
| 2-Bippe | 0.142 | 0.309 | 0.00360 | 277.8 | 4.8 |
| 4-Bippe | 0.061 | 0.133 | 0.00368 | 271.7 | −1.5 |
| Polyphenylphenol[2] | 0.081 | 0.176 | —[3] | —[3] | —[3] |

[1]From the freezing point depression equation assuming an ideal solution $$\frac{1}{T_i} = \frac{1}{T_{io}} - \frac{R}{\Delta H_i} \ln X_i$$

wherein:
$T_i$ = Temperature for first crystals to form (° K)
$T_{io}$ = Melting point (° K) of pure component i
$\Delta H_i$ = Molar heat of fusion of i (cal/mole)
$X_i$ = Mole fraction of component
$R$ = 1.9872 cal/mole°
[2]Calculated as a 4:1 2,6- and 2,4-diphenylphenol mixture
[3]Unavailable because the molar heat of fusions for the 2,6- and 2,4-diphenylphenols are unavailable. However, since the melting points of the two diphenylphenols are high (101° C and 90° C, respectively) and their combined molar concentration low (0.176), it is expected that T° C to be at least 5 (similar to that of 2-Bippe)

Table II illustrates the thermal stability of the present invention.

TABLE II

THERMAL STABILITY AT 385° C OF VARIOUS HEAT TRANSFER FLUIDS

| Ex | DPE[1] (%) | 2-Bippe[2] (%) | 3-Bippe[3] (%) | 4-Bippe[4] (%) | PPP[5] (%) | Other[6] (%) | 2-/4- Bippe Ratio | Weight Decomposition/Week |
|---|---|---|---|---|---|---|---|---|
| 13 | 33.2 | 46.8 | 1.6 | 10.0 | 4.9 | 2.3 | 4.6 | 3.2 |
| 14 | 29.7 | 37.2 | 1.3 | 16.2 | 10.4 | 3.4 | 2.3 | 3.9 |
| 15 | 33.5 | 36.0 | 1.9 | 8.8 | 18.1 | 1.4 | 4.1 | 3.2 |

[1]Diphenyl ether
[2]2-Biphenylylphenyl ether
[3]3-Biphenylylphenyl ether
[4]4-Biphenylylphenyl ether
[5]Polyphenylphenol mixture comprising about 80 weight percent 2,6- and 2,4-diphenylphenols and the balance (about 20 weight percent) various triphenylphenol and other diphenylphenol isomers
[6]Various impurities, such as o- and p-phenylphenols, o- and m-terphenyls, phenylnaphthalene, methylphenylnaphthalene, etc.

Although the polyphenylphenol content of the Table II mixtures was increased from 4.9 percent to 18.1 percent, the thermal stability showed no significant fluctuation. This is contrary to expected results since most phenolic materials decrease the thermal stability of such heat transfer fluids.

What is claimed is:

1. A heat transfer fluid having a freeze point of about −18° C or less and consisting essentially of about, by weight:
   a. 20 to about 40 percent diphenyl ether;
   b. 40 to about 60 percent of a 2-biphenylylphenyl ether (2-bippe) and 4-biphenylylphenyl ether (4-bippe) mixture at a 2-bippe:4-bippe weight ratio of at least about 2:1; and
   c. 20 to about 25 percent of a di- and triphenylphenol mixture.

2. The heat transfer fluid of claim 1 wherein the diphenyl ether is present in an amount from about 25 percent to about 35 percent.

3. The heat transfer fluid of claim 1 wherein the 2-biphenylylphenyl ether and 4-biphenylylphenyl ether mixture is present in an amount from about 45 to about 55 percent.

4. The heat transfer fluid of claim 1 consisting essentially of about
   a. 25 to about 35 percent diphenyl ether;
   b. 45 to about 55 percent of a 2-biphenylylphenyl ether (2-bippe) and 4-biphenylylphenyl ether (4-bippe) mixture; and
   c. 20 to about 25 percent of a di- and triphenylphenol mixture.

5. The heat transfer fluid of claim 1 consisting essentially of about:
   a. 30 percent diphenyl ether;
   b. 50 percent of a 2-biphenylylphenyl ether and 4-biphenylylphenyl ether mixture; and
   c. 20 percent of a di- and triphenyl-phenol mixture.

* * * * *